Jan. 17, 1967  E. P. BULLARD III  3,298,283
FLUID TRANSMISSION SYSTEM
Filed Nov. 23, 1964
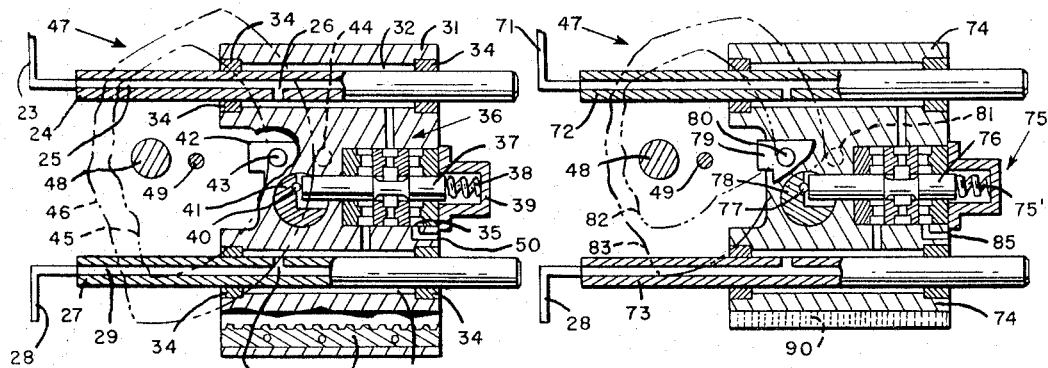
FIG.2   FIG.3
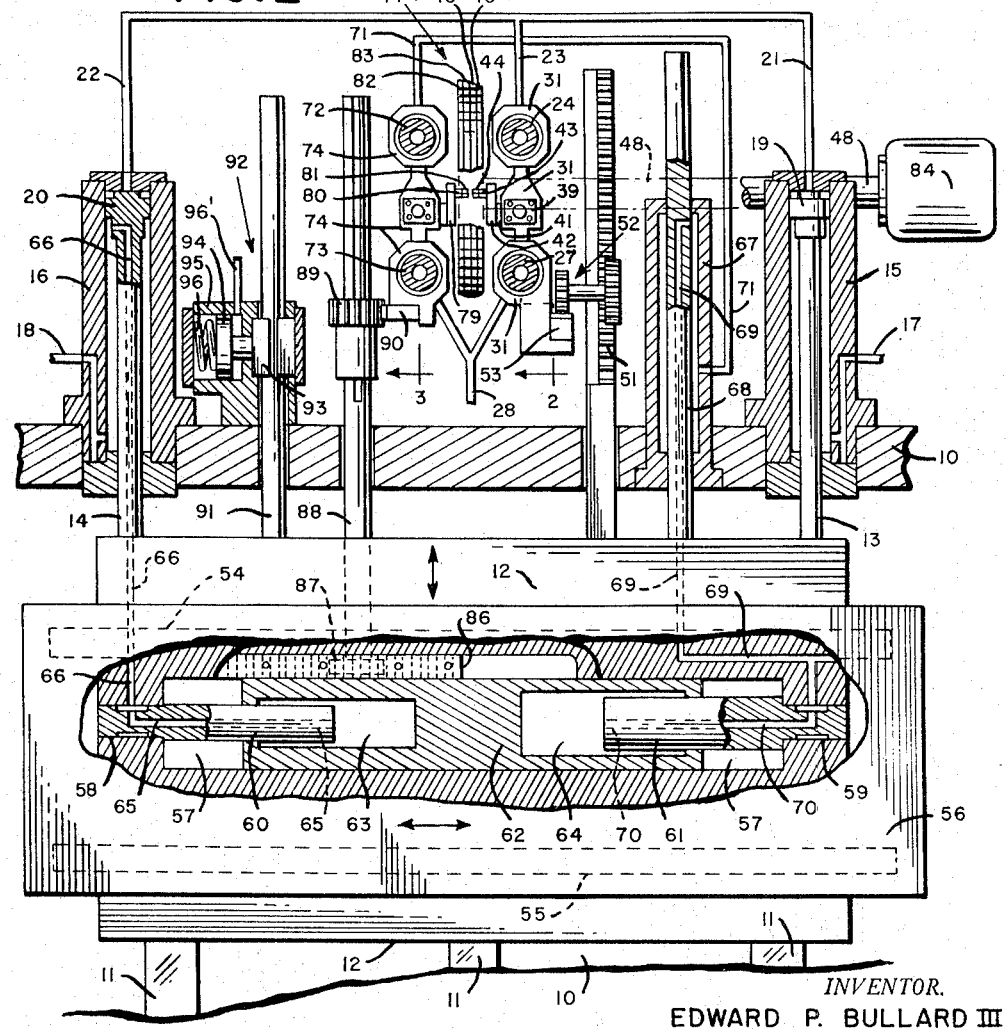
FIG.1
INVENTOR.
EDWARD P. BULLARD III
BY
ATTORNEY.

United States Patent Office 3,298,283
Patented Jan. 17, 1967

3,298,283
FLUID TRANSMISSION SYSTEM
Edward P. Bullard III, Fairfield, Conn., assignor to The Bullard Company, Bridgeport, Conn., a corporation of Connecticut
Filed Nov. 23, 1964, Ser. No. 413,009
17 Claims. (Cl. 91—37)

This invention relates to controls for machine tools, and particularly to an improved fluid-operated means for effecting the controlled movement of machine tool elements.

This invention is related to the apparatus shown, described and claimed in U.S. patent application Serial No. 354,631, filed March 25, 1964, now Patent 3,238,621, in the name of Edward P. Bullard III, to which application attention is directed for specific features of details.

In the controlled movement of machine tool elements by fluid-operated means, problems arise as to the manner of conducting the pressure fluid between the controls and the movable elements. The use of flexible tubing has been heretofore used in conducting pressure fluid to moving parts. While such flexible tubing is reasonably successful in machines where great accuracy is not demanded and relatively low pressure fluid is employed, it does not provide satisfactory operation where high pressure fluid is employed and extreme accuracies of movement are required. Particularly is this true where moving servo valve mechanism is necessary to conduct high pressure fluid through flexible tubing.

Variations in tube diameter due to pressure fluctuations cause inaccuracies to occur in the control mechanism. Furthermore, where a movable servo mechanism is employed in a feedback system, it preferably should be moved without any appreciable restraint. When a curved, flexibe tube is connected to such a device, it tends to act as a Bourdon tube, flexing with pressure variations and thus acting as a restraint or force affecting the movement of the servo mechanism.

The principal object of the present invention is to provide a fluid-operated, servo controlled feedback system in which the above as well as other problems have been overcome.

Another object of the invention is to provide a fluid-operated, servo controlled feedback system in which no flexible tubing is employed.

Still another object of the invention is to provide such a system in which a movable servo valve is employed in the feedback system, the movement of which valve is subjected to substantially no restraint.

Another object of the invention is to provide such a system in which all of the ducts for conveying the pressure fluid are of substantially rigid, non-flexible construction.

Still another object of the invention is to provide such a system in which rotatable template means acts on stylus means that operates a movable servo valve, and in which the movement of the servo valve is unaffected by pressure variations of the pressure fluid in the system.

Another object of the invention is to provide a tool support for a machine tool that is moved by differential piston and cylinder means.

In one aspect of the invention, a saddle may be mounted for movement along ways of a machine base. The saddle may be connected to piston rods that extend into cylinders that are fixedly mounted on the machine base. The cylinders may be connected at their one ends to a supply of constant pressure fluid that acts on a smaller area of the piston means. The cylinders may also be connected at their other ends through rigid, non-flexible piping to one end of a stationary, cylindrical way having axial passage means therein. Another identical stationary way may be located in parallel relation to said cylindrical way, and its axial passage may be connected to a source of constant pressure fluid.

In another aspect of the invention, a servo valve body may be mounted for limited movement along the stationary cylindrical ways and it may support a valve spool that cooperates with ports leading to both of the axial passages in the stationary parallel ways, as well as an exhaust port. The spool may be operated by a stylus that contacts rotary template means having contours that correspond to a desired movement of the saddle. There may also be provided a mechanical feedback in the form of a rack and pinion leading from the saddle to the servo valve body.

In still another aspect of the invention, a tool-supporting slide may be mounted on the saddle for movement along ways on the saddle that extend in a direction at right angles to the path of movement of the saddle. The movement of the slide on the saddle is effected by a unique differential piston and cylinder mechanism that is supplied with pressure fluid through substantially rigid, non-flexible conduits. To this end, the saddle may be cut away to accommodate oppositely extending, axially aligned piston means that are integral with the saddle and hence do not move axially. The slide may include a portion that extends into the cut-away portion of the saddle, and it may be provided with axially aligned cylinders adapted to receive the pistons previously referred to. These cylinder and piston means may have different effective areas.

In a further aspect of the invention, one of the saddle-connected piston rods may have axial passage means that extend into the saddle and which is in communication with an axial passage means of the piston on the saddle of the smaller area. A rod attached to the saddle may extend through a stationary cylinder on the machine base that is supplied with controlled pressure fluid. The rod includes porting and passage means leading through the saddle to passage means in the saddle piston having the larger area. Accordingly, supplying pressure fluid to the larger area piston on the saddle moves the slide in one direction, while exhausting the cylinder of the larger area piston effects movement of the slide in the opposite direction.

In a still further aspect of the invention, the stationary cylinder on the machine base through which the rod extends is connected by a rigid, non-flexible pipe to one end of a stationary cylindrical way that is parallel with another cylindrical way, both of which support another servo valve body identical with, and operable in the same fashion as the valve body previously described in connection with the movement of the saddle. Rack and pinion feedback means is employed between this valve body and the slide, similar to the feedback means for the saddle.

The above, other objects and novel features of the improved system will become apparent from the following specification and accompanying drawing which are merely exemplary.

In the drawing:

FIG. 1 is an elevational view, partly in section, of part of a machine tool to which the principles of the invention have been applied;

FIG. 2 is a sectional view taken substantially along line 2—2 of FIG. 1; and

FIG. 3 is a sectional view taken substantially along line 3—3 of FIG. 1.

Referring to the drawing, the principles of the invention are shown as applied to a machine tool including a base 10 having vertical, parallel spaced ways 11 thereon.

A saddle 12 is mounted on said ways 11 for movement therealong. Rods 13 and 14, fixed to the top of saddle 12, extend upwardly into cylinders 15 and 16 that are rigidly mounted on base 10. Cylinders 15 and 16 are connected to constant pressure fluid lines 17 and 18, the pressure fluid therein acting on the faces of pistons 19 and 20 of lesser effective area, tending to move saddle 12 upwardly along ways 11.

The opposite ends of cylinders 15 and 16 are connected by rigid, non-flexible pipe lines 21, 22 to a common rigid pipe line 23 that in turn is connected to one end of a cylindrical way 24 (the opposite end being closed) that is stationarily mounted within base 10. The way 24 includes an axial passage 25 and a transverse passage 26 for a purpose to be described later.

Another stationary cylindrical way 27 is parallel with way 24 and one of its ends is connected to a rigid, stationary constant pressure line 28 (the opposite end of way 27 being closed). Way 27 includes an axial passage 29 and transverse passage 30.

A block 31 includes chambers 32 and 33 through which ways 24 and 27 extend. The ends of chambers 32 and 33 are closed by bushings 34. Block 31 also includes a chamber 35 for the reception of a valve body 36, axially through the center of which a spool 37 extends. A spring 38 in a cap 39 constantly urges spool 37 into line contact at 40 on a rotatable or oscillatable shaft 41. An arm 42 is connected to shaft 41 and it supports a pair of spaced styluses 43 and 44 that cooperate with separate parts 45, 46 of a composite template 47.

The valve 36 may be made in the manner shown, described and claimed in U.S. application Serial No. 383,794, filed July 20, 1964, in the name of Edward P. Bullard III. The styluses 43, 44 and their cooperation with composite template 47 may be the same as those shown, described and claimed in application Serial No. 354,631, now Patent 3,238,621, filed March 25, 1964, in the name of Edward P. Bullard III, to which application attention is directed for specific details not fully discussed herein.

The composite template 47 is fixed to a shaft 48, and a locating pin 49 ensures that the template 47 is angularly located relative to the styluses 43, 44 at the start of a cycle of operations.

From the foregoing it is evident that as the shaft 48 is caused to rotate, composite template 47 will act on styluses 43, 44 to cause movement of spool 37 rightwardly, and spring 38 will move it leftwardly to maintain contact between the template 47 and one of the styluses 43, 44.

Thus, movement of spool 37 rightwardly (FIG. 2) opens chamber 32 to exhaust port 50 and with it lines 23, 21 and 22. Accordingly, the constant pressure in lines 18 and 17 causes pistons 19, 20 and saddle 12 to move upwardly. Movement of spool 37 leftwardly (FIG. 2) admits constant pressure fluid from line 28 to chambers 33, 32, lines 23, 21 and 22, acting on the top of pistons 19 and 20. Since the effective top area of pistons 19, 20 is greater than the bottom effective area of said pistons, the constant pressure of lines 17 and 18 is overcome and saddle 12 moves downwardly.

A mechanical feedback is provided between saddle 12 and block 31. It comprises a rack 51 mounted on the top of saddle 12. Rack 51 meshes with gearing 52 that drives a rack 53 fixed to block 31. Accordingly, as saddle 12 moves along its path of motion, the block 31 is moved in direct proportion thereto, thereby completing the closed servo loop of the system.

Ways 54 and 55 on saddle 12 receive a slide 56 for movement at right angles to the motion of saddle 12 along base 10. The slide 56 may support one or more tools (not shown) adapted to be moved into contact with work.

The saddle 12 may include a cutout portion 57 and axially aligned bores 58, 59 at each end thereof within which bores pistons 60, 61 are mounted for movement with saddle 12 but fixed against axial movement. Slide 56 includes a portion 62 that extends into cutout portion 57, and said portion 62 includes aligned cylinders 63, 64 into which pistons 60, 61 extend. The effective area of cylinder 63 is less than that of cylinder 64 for a purpose that will appear hereafter.

Piston 60 includes an axial passage 65 that communicates with a passage 66 in the saddle 12. Passage 66 extends upwardly through rod 14, opening at the lower face of piston 20 into cylinder 16 that is supplied with constant pressure fluid from rigid pipe 18. Accordingly, slide 56 is constantly urged rightwardly regardless of the elevational position of saddle 12.

A cylinder 67 is fixed to base 10 and it receives a rod 68 that extends therethrough and is connected to the top of saddle 12. A passage 69 extends through rod 68 and communicates at one end with the interior of cylinder 67. The opposite end of passage 69 communicates with a passage 70 extending through piston 61. Accordingly, admission of pressure fluid into cylinder 64 overcomes the force created by cylinder 63 since cylinder 64 is of greater cross section, and slide 56 moves leftwardly.

A non-flexible, rigid pipe 71 connects the cylinder 67 to one end of a stationary cylindrical way 72 (FIG. 3) that is mounted in base 10 and fixed against motion therein. Another cylindrical way 73, parallel with way 72, is also fixed against motion in base 10. A block 74 is mounted on ways 72, 73 for movement therealong in the same manner that block 31 is mounted on ways 24 and 27. Block 74 supports a valve 75 identical with valve 36. Valve 75 includes a spool 76 that is urged by a spring 75' into line contact at 77 of an oscillatable shaft 78. An arm 79 is connected to shaft 78 and is supports a pair of styluses 80, 81. The styluses 80, 81 cooperate with other separate parts 82, 83 of the composite template 47.

From the foregoing it is evident that as the template 47 rotates by energization of motor 84, the separate parts 82, 83 thereof will act on styluses 80, 81 to move the spool 76 rightwardly, while spring 75' will move it leftwardly to maintain contact at all times between spool 76 and contact 77. Movement of spool 76 rightwardly will open lines 71 and 69 to an exhaust port 85 in block 74. Accordingly, cylinder 64 is open to exhaust, and the pressure fluid in cylinder 63 moves slide 56 rightwardly. Movement of spool 76 to the left closes exhaust port 85 and supplies pressure fluid from line 28 to way 73, thence to lines 71 and 69. This produces a force in cylinder 64 that overcomes the force produced in cylinder 63, and the slide 56 moves leftwardly.

To complete the servo loop for the moving means of slide 56, a rack 86 is fixed to, and movable with slide 56. Rack 86 meshes with a pinion 87 fixed to shaft 88, which latter extends upwardly along block 74 and has another pinion 89 keyed thereto for relative movement therealong. Pinion 89 meshes with a rack 90 fixed to block 74. Accordingly, any movement of slide 56 along ways 54, 55 of saddle 12 proportionally moves block 74 to complete the closed servo loop of the system for slide 56. Thus, as slide 56 moves rightwardly in FIG. 1, the mechanical feedback including rack 86, pinions 87, 89 and rack 90 moves block 74 in FIG. 3 rightwardly a proportional amount. This tends to move spool 76 away from contact 77, but spring 75' maintains this contact so, in effect, spool 76 moves leftwardly, cutting off the flow of pressure fluid from cylinder 64 to exhaust 85.

Furthermore, as slide 56 moves leftwardly in FIG. 1, the mechanical feedback moves block 74 in FIG. 3 leftwardly a proportional amount, moving spool 76 rightwardly, cutting off the flow of pressure fluid from line 28 through lines 71 and 69 to cylinder 64.

In order to prevent the saddle 12 and slide 56 from moving downwardly along ways 11 when the base 10 is vertical, a rod 91, fixed to saddle 12 extends upwardly through a brake 92 that is mounted on base 10. Brake 92 includes a shoe 93 that is connected to a piston 94 within a cylinder 95. A spring 96 in cylinder 95 normally urges shoe 93 into braking relation with rod 91. A constant pressure line 96' acts to release brake 92 at all times that pressure is on the system.

Although the various features of the improved control have been shown and described in detail to fully disclose one embodiment of the invention, it will be evident that changes may be made in such details and certain features may be used without others without departing from the principles of the invention.

What is claimed is:

1. Apparatus comprising in combination, a member; piston and cylinder means for moving said member along a path of travel in accordance with a predetermined program; rotatable template means, the coordinates of said template means being proportional to the corresponding axis coordinates of the desired program; spaced stationary way means having axially extending passage means therein mounted adjacent said template means; valve body means mounted on said way means for limited movement therealong; chamber means within said valve body means; spool means within said chamber means; stylus means movably mounted adjacent said valve body means having one surface engageable with said spool means and another surface engageable with said template means; means for continuously urging said spool means into engagement with said stylus means and thereby said stylus means into engagement with said template means; porting within said valve body means for establishing communication between the passage means in said way means and said chamber means throughout the extent of movement of said valve body means; means connecting the passage means in one of said way means to a pressure liquid supply; means connecting the passage means in said other way means to said piston and cylinder means; feedback means between said member and said valve body means; and means for rotating said template means, whereby the velocity and direction of movement of said member are continuously under the control of a mechanism totally unaffected by the variable velocity of said member and the variable forces acting thereon.

2. Apparatus comprising in combination, a member; differential effective area piston and cylinder means for moving said member along a path of travel in accordance with a predetermined program; rotatable template means, the coordinates of said template means being proportional to the corresponding axis coordinates of the desired program; stationary way means having axially extending passage means therein mounted adjacent said template means; valve body means mounted on said way means for limited movement therealong; chamber means within said valve body means; spool means within said chamber means; stylus means movably mounted adjacent said valve body means having one surface engageable with said spool means and another surface engageable with said template means; means for continuously urging said spool means into engagement with said stylus means and thereby said stylus means into engagement with said template means; porting within said valve body means for establishing communication between the passage means in said way means and said chamber means throughout the extent of movement of said valve body means; pressure liquid supply means connected to the passage means in one of said way means, and to said piston and cylinder means in a manner to act on the lesser effective area thereof; means for connecting the passage means of said other way means to said piston and cylinder means in a manner to act on the larger effective area thereof; feedback means between said member and said valve body means; and means for rotating said template means, whereby the velocity and direction of movement of said member are continuously under the control of a mechanism totally unaffected by the variable velocity of said member and the variable forces acting thereon.

3. Apparatus comprising in combination, a saddle; piston and cylinder means for moving said saddle along a path of travel; a slide mounted on said saddle for movement along a path angularly related to the path of travel of said saddle; separate piston and cylinder means for moving said slide along its path of travel; separate rotatable template means for said saddle and slide, the coordinates of said template means being proportional to the corresponding axis coordinates of the saddle and slide for a desired program; spaced stationary way means for each of said template means, said way means including axially extending passage means therein; separate valve body means mounted on said way means for limited movement therealong; chamber means within each of said valve body means; spool means within each of said chamber means; separate stylus means movably mounted adjacent each of said valve body means, each having a surface engageable with its corresponding spool means and another surface engageable with its corresponding template means; means for continuously urging said spool means into engagement with its corresponding stylus means and thereby said stylus means into engagement with its corresponding template means; porting within each of said valve body means for establishing communication between the passage means in said way means and the corresponding chamber means throughout the extent of movement of the corresponding valve body means; means connecting the passage means in one of the way means for each of said valve body means to a pressure liquid supply; means connecting the passage means in the other way means for each of said valve body means to the corresponding piston and cylinder means; feedback means between said saddle and its valve body means; separate feedback means between said slide and its valve body means; and means for rotating both of said template means together, whereby the velocity and direction of movement of said saddle and slide are continuously under the control of mechanism totally unaffected by the variable velocity of said saddle and slide and the variable forces acting thereon.

4. Apparatus comprising in combination, a saddle; differential effective area piston and cylinder means for moving said saddle along a path of travel; a slide mounted on said saddle for movement along a path angularly related to the path of travel of said saddle; separate differential effective area piston and cylinder means for moving said slide along its path of travel; separate rotatable template means for said saddle and slide, the coordinates of said template means being proportional to the corresponding axis coordinates of the saddle and slide for a desired program; spaced stationary way means for each of said template means, said way means including axially extending passage means therein; separate valve body means mounted on said way means for limited movement therealong; chamber means within each of said valve body means; spool means within each of said chamber means; separate stylus means movably mounted adjacent each of said valve body means, each having a surface engageable with its corresponding spool means and another surface engageable with its corresponding template means; means for continuously urging said spool means into engagement with its corresponding stylus means and thereby said stylus means into engagement with its corresponding template means; porting within each of said valve body means for establishing communication between the passage means in said way means and the corresponding chamber means throughout the extent of movement of the corresponding valve body means; means connecting the passage means in one of the way means for each of said valve body means to a pressure liquid supply and to the corresponding piston and cylinder means in a manner to act on the lesser effective area thereof; means for connecting the passage means of said other way means for each of said valve body means to the corresponding piston and cylinder means in a manner to act on the larger effective area thereof; feedback means between said saddle and its valve body means; separate feedback means between said slide and its valve body means; and means for rotating both of said template means together, whereby the velocity and direction of movement of said saddle and slide are continuously under the control of mechanism totally unaffected by the variable velocity of said saddle and slide and the variable forces acting thereon.

5. Apparatus comprising in combination, a member; piston and cylinder means for moving said member along a path of travel in accordance with a predetermined program; rotatable template means, the coordinates of said template means being proportional to the corresponding axis coordinates of the desired program; spaced stationary way means having axially extending passage means therein mounted adjacent said template means; valve body means mounted on said way means for limited movement therealong; chamber means within said valve body means; spool means within said chamber means; stylus means movably mounted adjacent said valve body means having one surface engageable with said spool means and another surface engageable with said template means; means for continuously urging said spool means into engagement with said stylus means and thereby said stylus means into engagement with said template means; porting within said valve body means for establishing communication between the passage means in said way means and said chamber means throughout the extent of movement of said valve body means; means connecting the passage means in one of said way means to a pressure liquid supply; means connecting the passage means in said other way means to said piston and cylinder means; feedback means between said member and said valve body means; means normally preventing the movement of said member; means responsive to said pressure liquid supply for rendering ineffective said movement preventing means; and means for rotating said template means, whereby the velocity and direction of movement of said member are continuously under the control of a mechanism totally unaffected by the variable velocity of said member and the variable forces acting thereon.

6. Apparatus comprising in combination, a saddle; piston and cylinder means for moving said saddle along a path of travel; a slide mounted on said saddle for movement along a path angularly related to the path of travel of said saddle; separate piston and cylinder means for moving said slide along its path of travel; separate rotatable template means for said saddle and slide, the coordinates of said template means being proportional to the corresponding axis coordinates of the saddle and slide for a desired program; spaced stationary way means for each of said template means, said way means including axially extending passage means therein; separate valve body means mounted on said way means for limited movement therealong; chamber means within each of said valve body means; spool means within each of said chamber means; separate stylus means movably mounted adjacent each of said valve body means, each having a surface engageable with its corresponding spool means and another surface engageable with its corresponding template means; means for continuously urging said spool means into engagement with its corresponding stylus means and thereby said stylus means into engagement with its corresponding template means; porting within each of said valve body means for establishing communication between the passage means in said way means and the corresponding chamber means throughout the extent of movement of the corresponding valve body means; means connecting the passage means in one of the way means for each of said valve body means to the corresponding piston and cylinder means; feedback means between said saddle and its valve body means; separate feedback means between said slide and its valve body means; means normally preventing the movement of said member; means responsive to said pressure liquid supply for rendering ineffective said movement preventing means; and means for rotating both of said template means together, whereby the velocity and direction of movement of said saddle and slide are continuously under the control of mechanism totally unaffected by the variable velocity of said saddle and slide and the variable forces acting thereon.

7. Apparatus comprising in combination, a base; a saddle mounted on said base for rectilinear movement therealong; a slide mounted on said saddle for movement along a path angularly related to the path of movement of said saddle; separate piston and cylinder means for said saddle and slide, said piston and cylinder means including differential effective area means; substantially rigid, non-flexible fluid duct means for continuously admitting constant pressure fluid to the piston and cylinder means of lesser effective area; rotatable template means mounted on said base having separate components the coordinates of which are proportional to the corresponding axis coordinates of said saddle and slide; separate servo valve means for said saddle and slide mounted on said base for movement toward and away from said template means; fluid duct means communicating with passages in said movable servo valve means, said fluid duct means being stationary, substantially rigid, non-flexible members; and substantially rigid, non-flexible fluid duct means connecting said servo valve means to the larger effective area means of said piston and cylinder means.

8. Apparatus comprising in combination, a base; a saddle mounted on said base for rectilinear movement therealong; a slide mounted on said saddle for movement along a path angularly related to the path of movement of said saddle; separate piston and cylinder means for said saddle and slide, said piston and cylinder means including differential effective area means; substantially rigid, non-flexible fluid duct means for continuously admitting constant pressure fluid to the piston and cylinder means of lesser effective area; rotatable template means mounted on said base having separate components the coordinates of which are proportional to the corresponding axis coordinates of said saddle and slide; separate servo valve means for said saddle and slide mounted on said base for movement toward and away from said template means; fluid duct means communicating with passages in said movable servo valve means, said fluid duct means being stationary, substantially rigid, non-flexible members; substantially rigid, non-flexible fluid duct means connecting said servo valve means to the larger effective area means of said piston and cylinder means; feedback means between said saddle and its corresponding servo valve means; and other feedback means between said slide and its corresponding servo valve means.

9. Apparatus comprising in combination, a base; a saddle mounted on said base for rectilinear movement therealong; rods connected to said saddle at each end thereof, said rods extending into cylinders stationarily mounted on said base; piston means having differential effective areas on either side thereof, connected to said rods for reciprocation within said cylinders; stationary substantially non-flexible pipe means for supplying constant pressure fluid to said cylinders in a manner to act on the smaller effective areas of said piston means; stationary, substantially non-flexible pipe means for connecting supply pressure fluid to the ends of said cylinders in a manner to act on the larger effective areas of said piston means; valve means movably mounted relative to said base for controlling the flow of pressure fluid to the larger effective areas of said piston means; and fluid duct means communicating with flow passages in said movable valve means, said fluid duct means being stationary, substantially rigid, non-flexible members.

10. Apparatus comprising in combination, a base; a saddle mounted on said base for rectilinear movement therealong; rods connected to said saddle at each end thereof, said rods extending into cylinders stationarily mounted on said base; piston means having differential effective areas on either side thereof, connected to said rods for reciprocation within said cylinders; stationary, substantially non-flexible pipe means for supplying constant pressure fluid to said cylinders in a manner to act on the smaller effective areas of said piston means; stationary, substantially non-flexible pipe means for connecting supply pressure fluid to the ends of said cylinders in a manner to act on the larger effective areas of said piston means; servo valve means movably mounted relative to said base for controlling the flow of pressure fluid to the larger effective areas of said piston means; and fluid duct means communicating with flow passages in said movable servo valve means, said fluid duct means being stationary, substantially rigid, non-flexible members.

11. Apparatus comprising in combination, a base; a saddle mounted on said base for rectilinear movement therealong; rods connected to said saddle at each end thereof, said rods extending into cylinders stationarily mounted on said base; piston means having differential effective areas on either side thereof, connected to said rods for reciprocation within said cylinders; means for supplying constant pressure fluid to said cylinders in a manner to act on the smaller effective areas of said piston means; rotatable template means mounted on said base; stationary ways having axial passage means therein, mounted on said base adjacent said template means; valve block means mounted on said stationary ways for movement therealong; valve means within said block means in position to be acted upon by said template means; porting between said valve means and the passage means in said stationary ways; means connecting supply pressure fluid to the passage means in one of said ways; and rigid, non-flexible duct means for connecting the passage means in the other of said ways to said cylinders so as to act on the larger effective areas of said piston means.

12. Apparatus comprising in combination, a base; a saddle mounted on said base for rectilinear movement therealong; rods connected to said saddle at each end thereof, said rods extending into cylinders stationarily mounted on said base; piston means having differential effective areas on either side thereof, connected to said rods for reciprocation within said cylinders; stationary, substantially non-flexible pipe means for supplying constant pressure fluid to said cylinders in a manner to act on the smaller effective areas of said piston means; stationary, substantially non-flexible pipe means for connecting supply pressure fluid to the ends of said cylinders in a manner to act on the larger effective areas of said piston means; servo valve means movably mounted relative to said base for controlling the flow of pressure fluid to the larger effective areas of said piston means; fluid duct means communicating with flow passages in said movable servo valve means, said fluid duct means being stationary, substantially rigid, non-flexible members; and feedback means from said saddle to said servo valve means.

13. Apparatus comprising in combination, a base; a saddle mounted on said base for rectilinear movement therealong; rods connected to said saddle at each end thereof, said rods extending into cylinders stationarily mounted on said base; piston means having differential effective areas on either side thereof, connected to said rods for reciprocation within said cylinders; means for supplying constant pressure fluid to said cylinders in a manner to act on the smaller effective areas of said piston means; rotatable template means mounted on said base; stationary ways having axial passage means therein, mounted on said base adjacent said template means; valve block means mounted on said stationary ways for movement therealong; valve means within said block means in position to be acted upon by said template means; porting between said valve means and the passage means in said stationary ways; means connecting supply pressure fluid to the passage means in one of said ways; rigid, non-flexible duct means for connecting the passage means in the other of said ways to said cylinders so as to act on the larger effective areas of said piston means; and feedback means from said saddle to said block means.

14. Apparatus comprising in combination, a base; a saddle mounted on said base for rectilinear movement therealong; rods connected to said saddle at each end thereof, said rods extending into cylinders stationarily mounted on said base; piston means having differential effective areas on either side thereof, connected to said rods for reciprocation within said cylinders; means for supplying constant pressure fluid to said cylinders in a manner to act on the smaller effective areas of said piston means; stationary, substantially non-flexible pipe means for connecting supply pressure fluid to the ends of said cylinders in a manner to act on the larger effective areas of said piston means; a slide mounted on said saddle for movement along a path at an angle to the path of movement of said saddle; a chamber within said saddle; opposed piston means of differential effective area fixed to said saddle, extending into said chamber with the longitudinal axes thereof disposed parallel with the path of movement of said slide; means integral with said slide, extending into said chamber and including cylinders into which said opposed piston means extend and having corresponding different effective areas; passage means within one of said rods in communication with its corresponding cylinder as well as with passage means in the opposed piston means having the smaller effective area; means for controlling the flow of pressure fluid to the larger effective areas of said rod piston means; and means for controlling the flow of pressure fluid to passage means within the opposed piston means having the larger effective area.

15. Apparatus comprising in combination, a base; a saddle mounted on said base for rectilinear movement therealong; rods connected to said saddle at each end thereof, said rods extending into cylinders stationarily mounted on said base; piston means having differential effective areas on either side thereof, connected to said rods for reciprocation within said cylinders; means for supplying constant pressure fluid to said cylinders in a manner to act on the smaller effective areas of said piston means; stationary, substantially non-flexible pipe means for connecting supply pressure fluid to the ends of said cylinders in a manner to act on the larger effective areas of said piston means; a slide mounted on said saddle for movement along a path at an angle to the path of movement of said saddle; a chamber within said saddle; opposed piston means of differential effective area fixed to said saddle, extending into said chamber with the longitudinal axes thereof disposed parallel with the path of movement of said slide, means integral with said slide, extending into said chamber and including cylinders into which said opposed piston means extend and having corresponding different effective areas; passage means within one of said rods in communication with its corresponding cylinder as well as with passage means in the opposed piston means having the smaller effective area; servo means for controlling the flow of pressure fluid to the larger effective areas of said rod piston means; and servo means for controlling the flow of pressure fluid to passage means within the opposed piston means having the larger effective area.

16. Apparatus comprising in combination, a base; a saddle mounted on said base for rectilinear movement therealong; rods connected to said saddle at each end thereof, said rods extending into cylinder stationarily mounted on said base; piston means having differential effective areas on either side thereof, connected to said rods for reciprocation within said cylinders; means for supplying constant pressure fluid to said cylinders in a manner to act on the smaller effective areas of said piston means; a slide mounted on said saddle for movement along a path at an angle to the path of movement of said saddle; a chamber within said saddle; opposed piston means of differential effective area fixed to said saddle, extending into said chamber with the longitudinal axes thereof disposed parallel with the path of movement of said slide; means integral with said slide, extending into said chamber and including cylinders into which said opposed piston means extend and having corresponding different effective areas; passage means within one of said rods in communication with its corresponding cylinder as well as with passage means in the opposed piston means having the smaller effective area; rotatable template means mounted on said base; separate pairs of stationary ways having axial means therein mounted on said base adjacent said template means; separate valve block means mounted on said separate pairs of stationary ways for movement along the corresponding ways; valve means in each of said block means in position to be acted upon by said template means; porting between said valve means and the passage means in the corresponding pairs of stationary ways; means connecting supply pressure fluid to the passage means in one of each pair of said stationary ways and rigid, non-flexible duct means for connecting the passage means in the other way of one of said pairs of ways to said rod cylinders so as to act on the larger effective areas of said piston means therein, as well as connecting the passage means in the other way of the other of said pairs of ways to the slide cylinder having the larger effective area.

17. Apparatus comprising in combination, a base; a saddle mounted on said base for rectilinear movement therealong; rods connected to said saddle at each end thereof, said rods extending into cylinders stationarily mounted on said base; piston means having differential effective areas on either side thereof, connected to said rods for reciprocation within said cylinders; means for supplying constant pressure fluid to said cylinders in a manner to act on the smaller effective areas of said piston means; a slide mounted on said saddle for movement along a path at an angle to the path of movement of said saddle; a chamber within said saddle; opposed piston means of differential effective area fixed to said saddle, extending into said chamber with the longitudinal axes thereof disposed parallel with the path of movement of said slide; means integral with said slide, extending into said chamber and including cylinders into which said opposed piston means extend and having corresponding different effective areas; passage means within one of said rods in communication with its corresponding cylinder as well as with passage means in the opposed piston means having the smaller effective area; rotatable template means mounted on said base; separate pairs of stationary ways having axial passage means therein mounted on said base adjacent said template means; separate valve block means mounted on said separate pairs of stationary ways for movement along the corresponding ways; valve means in each of said block means in position to be acted upon by said template means; porting between said valve means and the passage means in the corresponding pairs of stationary ways; means connecting supply pressure fluid to the passage means in one of each pair of said stationary ways; rigid, non-flexible duct means for connecting the passage means in the other way of one of said pairs of ways to said rod cylinders so as to act on the larger effective areas of said piston means therein, as well as connecting the passage means in the other way of the other of said pairs of ways to the slide cylinder having the larger effective area; feedback means connected to said saddle and its corresponding valve block; and other feedback means connected to said slide and its corresponding valve block.

References Cited by the Examiner
UNITED STATES PATENTS

| | | | |
|---|---|---|---|
| 1,823,975 | 9/1931 | Ferris | 90—67 |
| 2,959,191 | 11/1960 | Schuman | 137—623 |
| 3,238,622 | 3/1966 | Bullard | 33—18 |

MARTIN P. SCHWADRON, *Primary Examiner.*

G. N. BAUM, *Assistant Examiner.*